United States Patent
Chen et al.

(10) Patent No.: US 12,345,936 B2
(45) Date of Patent: Jul. 1, 2025

(54) BUILDING CONTROL DEVICE WITH A LIGHT GUIDE CONFIGURED FOR UNIFORMLY ILLUMINATING A GRAPHICAL SYMBOL THAT IS VISIBLE TO A USER OF THE BUILDING CONTROL DEVICE

(71) Applicant: Honeywell International Inc., Charlotte, NC (US)

(72) Inventors: Chao Chen, Beijing (CN); Tonya Tang, Beijing (CN); Rick Han, Tianjin (CN); Lily Zhao, Tianjin (CN); Qixiang Hu, Tianjin (CN); Harvey Ma, Tianjin (CN); Helen Yan, Tianjin (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/466,798

(22) Filed: Sep. 13, 2023

(65) Prior Publication Data
US 2024/0264394 A1    Aug. 8, 2024

Related U.S. Application Data

(60) Provisional application No. 63/443,323, filed on Feb. 3, 2023.

(51) Int. Cl.
*G02B 6/42* (2006.01)
*G02B 6/35* (2006.01)

(52) U.S. Cl.
CPC .............. *G02B 6/428* (2013.01); *G02B 6/353* (2013.01); *G02B 6/4234* (2013.01)

(58) Field of Classification Search
CPC .. G02B 6/0088; G02B 6/0051; G02B 6/0065; G02B 6/0083; G02B 6/0068; G02B 6/0073
See application file for complete search history.

(56) References Cited

U.S. PATENT DOCUMENTS

| | | |
|---|---|---|
| 7,584,899 B2 | 9/2009 | De Pauw et al. |
| 7,708,442 B2 | 5/2010 | Ableitner |
| 9,282,657 B2 * | 3/2016 | Miyaoka ............. H04M 1/0283 |

(Continued)

OTHER PUBLICATIONS

Wu, "Learn by Example: How to Design Light Pipes," pp. 1-19. Accessed Jan. 30, 2023.

*Primary Examiner* — Arman B Fallahkhair
(74) *Attorney, Agent, or Firm* — Seager, Tufte & Wickhem, LLP

(57) ABSTRACT

A building control device includes a printed circuit board including control circuitry for controlling at least part of the building control device. An LCD display is operatively coupled to the printed circuit board and is controlled at least in part by the control circuitry of the printed circuit board. A plurality of LEDs are operatively coupled to the printed circuit board and are controlled at least in part by the control circuitry of the printed circuit board. An opaque plate defines an at least translucent arc-shaped region that extends around at least part of the LCD display. A light guide is situated behind the opaque plate and is configured to be illuminated by the plurality of LEDs such that light from the light guide is visible through the at least translucent arc-shaped region of the opaque plate.

17 Claims, 16 Drawing Sheets

(56) References Cited

U.S. PATENT DOCUMENTS

| | | |
|---|---|---|
| 9,951,968 B2 | 4/2018 | Novotny et al. |
| 9,964,294 B2 * | 5/2018 | Osborne ................ H05K 1/189 |
| 10,895,353 B2 * | 1/2021 | Diana .................... H05K 1/028 |
| 10,914,431 B2 * | 2/2021 | Kraz ........................ F21K 9/61 |
| 11,506,369 B2 * | 11/2022 | Vasylyev ............. G02B 6/0055 |
| 11,560,094 B2 | 1/2023 | Huizen et al. |
| 11,774,071 B1 * | 10/2023 | Hsu ..................... H01H 13/023 |
| | | 362/23.05 |
| 2004/0240193 A1 | 12/2004 | Mertz et al. |
| 2007/0291473 A1 | 12/2007 | Traynor |
| 2015/0194082 A1 * | 7/2015 | McEwan ................. G09F 13/02 |
| | | 40/591 |
| 2016/0231493 A1 * | 8/2016 | Lordache ............. B60R 13/005 |
| 2018/0003881 A1 * | 1/2018 | Tang .................... G02B 6/0013 |
| 2020/0012174 A1 * | 1/2020 | Shoemake ........... G06F 1/1632 |
| 2020/0276891 A1 * | 9/2020 | van Doleweerd .......................... |
| | | B32B 17/10036 |
| 2022/0193286 A1 | 6/2022 | Gonabal |

\* cited by examiner

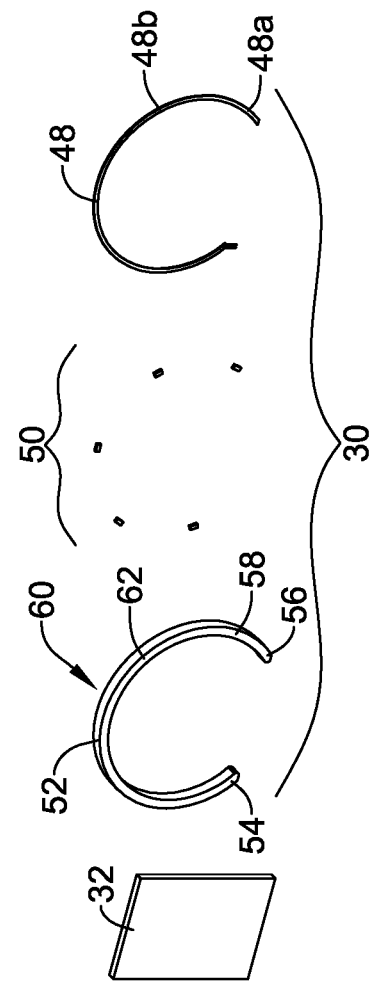
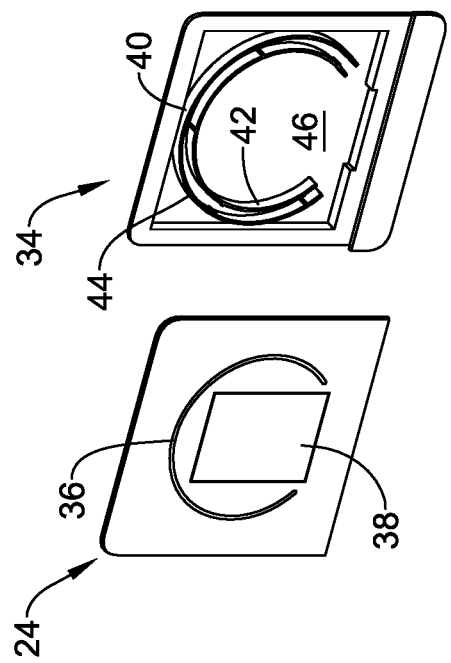
FIG. 3

BUILDING CONTROL DEVICE WITH A LIGHT GUIDE CONFIGURED FOR UNIFORMLY ILLUMINATING A GRAPHICAL SYMBOL THAT IS VISIBLE TO A USER OF THE BUILDING CONTROL DEVICE

RELATED APPLICATIONS

This application claims the benefit of U.S. Provisional Patent Application Ser. No. 63/443,323, filed Feb. 3, 2023, which application is incorporated by reference herein.

TECHNICAL FIELD

The present disclosure pertains to building control devices and more particularly to user interface elements for building control devices.

BACKGROUND

A variety of building control devices include user interfaces for accepting and displaying information regarding operation of the associated building devices. User interfaces may include lighting assemblies that are configured to display graphical symbols separate from an LCD display to convey certain information to a user. For example, a graphical symbol may indicate to a user an error status or an operating mode of the building control device. This is just an example. What would be desirable are lighting assemblies for building control devices that have improved performance and/or reduced manufacturing costs.

SUMMARY

The present disclosure pertains to building control devices and more particularly to user interface elements for building control devices. An example may be found in a building control device. The building control device includes a printed circuit board including control circuitry for controlling at least part of the building control device. An LCD display is operatively coupled to the printed circuit board and is controlled at least in part by the control circuitry of the printed circuit board. A plurality of LEDs are operatively coupled to the printed circuit board and are controlled at least in part by the control circuitry of the printed circuit board. An opaque plate defines an at least translucent arc-shaped region that extends around at least part of the LCD display. A light guide is situated behind the opaque plate and is configured to be illuminated by the plurality of LEDs such that light from the light guide is visible through the at least translucent arc-shaped region of the opaque plate.

Another example may be found in a building control device. The building control device includes a printed circuit board including a control circuitry for controlling at least part of the building control device. An LCD display is operatively coupled to the printed circuit board and is controlled at least in part by the control circuitry of the printed circuit board. A plurality of LEDs are operatively coupled to the printed circuit board and are controlled at least in part by the control circuitry of the printed circuit board. A front lens is masked to be opaque except in one or more defined regions, wherein the one or more defined regions define an LCD viewing window that is aligned with the LCD display and an arc-shaped window that extends around at least part of the LCD viewing window. A light guide is situated behind the front lens and is configured to be illuminated by the plurality of LEDs such that light from the light guide is visible through the arc-shaped window defined by the front lens.

Another example may be found in a building control device. The building control device includes a printed circuit board including a control circuitry for controlling at least part of the building control device. An LCD display is operatively coupled to the printed circuit board and is controlled at least in part by the control circuitry of the printed circuit board. A plurality of LEDs are operatively coupled to the printed circuit board and are controlled at least in part by the control circuitry of the printed circuit board. A front lens is masked to be opaque except in one or more defined regions, wherein the one or more defined regions define an LCD viewing window that is aligned with the LCD display and an arc-shaped window that extends around at least part of the LCD viewing window. A light guide is situated behind the front lens and is configured to be illuminated by the plurality of LEDs. An opaque plate situated is between the light guide and the front lens, the opaque plate defining an at least translucent arc-shaped region that is in registration with the arc-shaped window of the front lens, the at least translucent arc-shaped region allowing light from the light guide to pass through the at least translucent arc-shaped region of the opaque plate and to the arc-shaped window defined by the front lens.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 3 is a partially exploded view of the illustrative building control device shown in FIG. 2;

Figure 1:
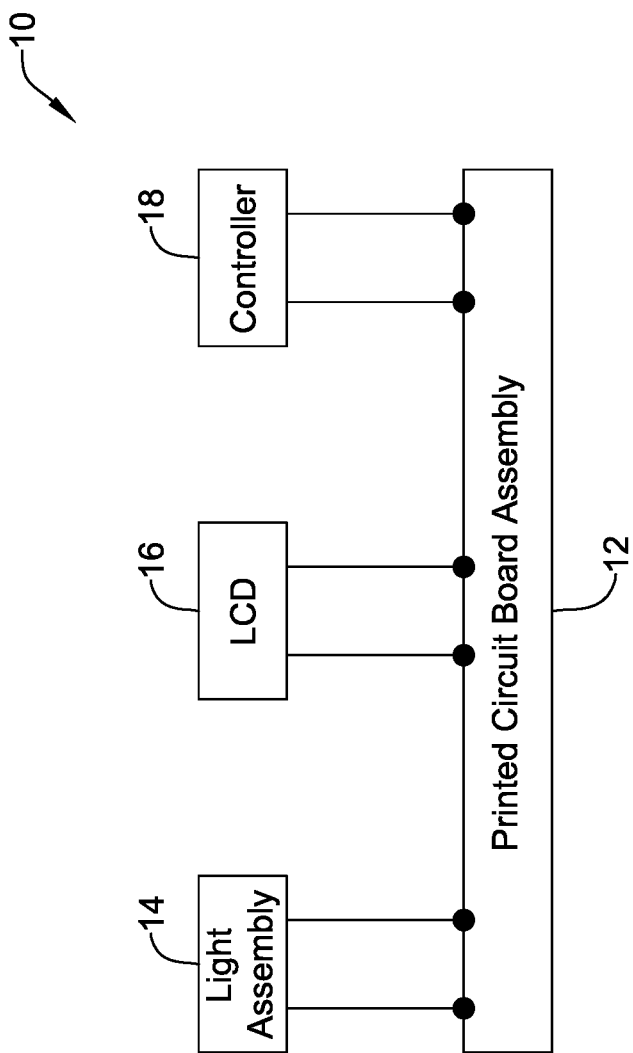
FIG. 1 is a schematic block diagram showing an illustrative building control device.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The term "about" means within a range of plus or minus 10 percent of the expressed number. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Building control devices including lighting assemblies are described herein. In some cases, a building control device includes a printed circuit board assembly, with a lighting assembly operatively coupled to the printed circuit board assembly. The printed circuit board assembly may further include a controller that is configured to control the operation of the building control device, and in some cases, building device or devices for which the building control device is responsible for controlling. In some cases, the lighting assembly may have a complicated shape in which the lighting assembly extends in multiple directions through a plane in which the lighting assembly extends. In some cases, the lighting assembly may have a curved or arc-like shape. In some cases, the lighting assembly may have a more block shape including a first vertical component, a second vertical component and a horizontal component spanning between the first vertical component and the second vertical component. In some cases, the lighting assembly may be configured to fit around two or more sides of an LCD display that forms part of the user interface of the building control device. In some cases, the lighting assembly may include LED light sources. These are just examples.

The building control devices may be any suitable building control device, such as building control devices of one or more building control systems such as HVAC systems, security systems, lighting control systems, fire systems and the like. The building control devices may be building controllers such as thermostats, security panels, lighting control panels, and/or any other suitable building controller. In some cases, the building control devices may simply be user interface panels that are operatively coupled to a building controller. These are just examples.

In an example, a building control device includes a printed circuit board assembly. A controller for controlling the building control device is operatively coupled to the printed circuit board assembly. In some cases, an arc-shaped lighting assembly is operatively coupled to the printed circuit board assembly and is controlled by the controller. In some cases, the arc-shaped lighting assembly includes an arc-shaped substrate (e.g. arc-shaped flexible printed circuit board) with a front side and a back side and one or more light sources (e.g. LEDs) mounted to the arc-shaped substrate. The illustrative arc-shaped lighting assembly further includes an elongated arc-shaped light guide with a first end, an opposing second end, a length along the arc shape between the first end and the second end, an arc-shaped light emitting front face, an arc-shaped rear face, and a side edge. The elongated arc-shaped light guide is mounted adjacent to the front side of the arc-shaped substrate, with the one or more light sources optically coupled to the elongated arc-shaped light guide such that light provided by the one or more light sources enters the elongated arc-shaped light guide and is distributed to the light emitting front face of the elongated arc-shaped light guide to provide a diffuse light output.

In some instances, the elongated arc-shaped light guide may include a polymer that is at least partially transparent. A light diffuser layer may be provided, which may help diffuse the light output across the light emitting front face of the elongated arc-shaped light guide. As an example, the polymer may include polycarbonate material, and the light diffuser layer may include titanium dioxide coated on the light emitting front face of the elongated arc-shaped light guide. In some cases, a solution including titanium dioxide may be painted onto the arc-shaped light guide. In some cases, the light emitting front face is etched with a light diffusing pattern to diffuse the light output. The diffuse light output may have an intensity variation across the light emitting front face of the elongated arc-shaped light guide that is below a Just Noticeable Difference (JND). The diffuse light output may have an intensity variation across the light emitting front face of the elongated arc-shaped light guide that is less than 10 percent, less than 5 percent, less than 1 percent or less than 0.1 percent. In some cases, the light diffuser layer and/or etched diffusing pattern may have a non-uniform pattern, sometimes providing a gradient across the light emitting front face. In one example, this may provide a "fade" effect where the diffuse light output fades from a higher intensity to a lower intensity across at least part of the light emitting front face of the elongated arc-shaped light guide. Such as a "fade" effect may fade from a higher intensity at the top of the arc to a lower intensity at each of the bottom ends of the arc.

In some instances, the building control device may include a transparent lens forming at least part of a front face of the building control device, wherein the transparent lens is masked to be opaque, with an opening in the mask that is in registration (e.g. in alignment) with the light emitting front face of the elongated arc-shaped light guide to reveal at least part of the light emitting front face of the elongated arc-shaped light guide. In some instances, the building control device may further include a light diffuser layer on the transparent lens at least in the opening in the mask that is in registration with the light emitting front face of the elongated arc-shaped light guide, to help further provide a diffused light output and to increase the uniformity of the light output to the user.

In some instances, the building control device may include an LCD display, wherein the elongated arc-shaped light guide extends around a periphery of at least part of two opposing sides of the LCD display. The building control device may include a transparent lens forming at least part of a front face of the building control device, wherein the transparent lens is masked to be opaque, with a first opening in the mask that is in registration (e.g. in alignment) with the light emitting front face of the elongated arc-shaped light guide to reveal at least part of the light emitting front face of the elongated arc-shaped light guide, and a second opening in the mask that is in registration with the LCD display to reveal at least part of the LCD display. In some instances, the LCD display may occupy at least part of a region defined between the side edge of the elongated arc-shaped light guide and an imaginary chord connecting the first end and the second end of the elongated arc-shaped light guide. In some instances, the LCD display and the arc-shaped lighting assembly may be mounted to the printed circuit board assembly of the building control device adjacent to one another in a non-overlapping manner.

In some instances, the elongated arc-shaped light guide extends along an arc of at least 180 degrees but less than 360 degrees, with the first end and the second end spaced from one another. An LCD display may be positioned such that an imaginary chord connecting the first end and the second end of the elongated arc-shaped light guide may intersect the LCD display, but this is not required.

In some instances, the elongated arc-shaped light guide may extend along an arc of 360 degrees, with the first end and the second end coincident (e.g. forming a donut shape). In some cases, an LCD display may be situated in the "hole" of the donut shaped elongated light guide. The building control device may include a transparent lens forming at least part of a front face of the building control device, wherein the transparent lens is masked to be opaque, with an opening in the mask that is in registration with the front face of the elongated arc-shaped light guide to reveal at least part of the front face of the elongated arc-shaped light guide.

In another example, a building control device includes a printed circuit board assembly that includes a controller for controlling the building control device. An LCD display is operatively coupled to the printed circuit board assembly and is controlled by the controller. A lighting assembly is operatively coupled to the printed circuit board assembly and is controlled by the controller. The lighting assembly includes a light guide that extends around a periphery of at least part of two opposing sides of the LCD display. In this example, the light guide has a front face, and one or more light sources optically coupled to the light guide such that light provided by the one or more light sources enters the light guide and is distributed to the front face of the light guide to provide a diffuse light output. In some cases, a cover forms at least part of a front face of the building control device, wherein the cover includes an at least translucent region that is in registration with at least part of the front face of the light guide, wherein the at least translucent region extends along a path around a periphery of at least part of two opposing sides of the LCD display.

In some instances, the light guide may include a first leg extending adjacent a first side of the LCD display, a second leg extending adjacent a second opposing side of the LCD display, and a third leg extending between the first leg and the second leg. A first light source of the one or more light sources is optically coupled to the light guide adjacent an intersection of the first leg and the third leg, and a second light source of the one or more light sources is optically coupled to the light guide adjacent an intersection of the second leg and the third leg.

In some instances, the cover may be a transparent cover that is masked to be opaque, with a first opening in the mask that corresponds to the at least translucent region and a second opening in the mask that is in registration with the LCD display. A diffusing layer may be added to the light guide and/or the first opening to make the light guide and/or the transparent cover in the first region more diffusive. In some instances, the first opening in the mask that corresponds to the at least translucent region may be arc-shaped that extends along an arc of at least 180 degrees but less than 360 degrees. In some instances, the first opening in the mask that corresponds to the at least translucent region may be arc-shaped that extends along an arc of 360 degrees (i.e. is donut shaped).

In another example, a building control device includes a printed circuit board assembly. The printed circuit board assembly includes a controller for controlling the building control device. A lighting assembly is operatively coupled to the printed circuit board assembly and is controlled by the controller. The lighting assembly includes a light guide that extends around a periphery of at least part of two opposing sides of an interposing region. The light guide includes a front face and one or more light sources optically coupled to the light guide such that light provided by the one or more light sources enters the light guide and is distributed to the front face of the light guide to provide a diffuse light output. In some cases, a cover forms at least part of a front face of the building control device, wherein the cover includes a transparent region that is in registration with at least part of the front face of the light guide, wherein the transparent region extends along a path around a periphery of at least part of two opposing sides of the interposing region. A diffusing layer may be added to the light guide and/or the transparent region of the cover to make the light guide and/or the transparent region of the cover more diffusive. In some instances, the building control device may include an LCD display situated at least partially in the interposing region. In some instances, translucent region of the cover may be arc-shaped that extends along an arc of at least 180 degrees but less than 360 degrees. In some instances, the translucent region of the cover may be arc-shaped that extends along an arc of 360 degrees (i.e. is donut shaped). These are just example shapes.

FIG. 1 is a schematic block diagram of an illustrative building control device 10. The building control device 10 may be used for monitoring and/or controlling operation of any of a variety of different building devices and/or systems.

For example, the building control device 10 may be used in controlling operation of various features of an HVAC (Heating, Ventilating and Air Conditioning) system, a security system, or a lighting system, a fire system, among other examples. It will be appreciated that not all components of the building control device 10 are illustrated in FIG. 1. For example, the building control device 10 may include a housing in one or several distinct parts. The building control device 10 may include other electronic devices, and may include hardware or software that allows the building control device 10 to communicate with various components of the building device or devices being controlled by the building control device 10.

The illustrative building control device 10 includes a Printed Circuit Board (PCB) assembly 12. While schematically shown as a monolithic structure, it will be appreciated that in some instances the PCB assembly 12 may include one, two or more distinct PCBs that are operably coupled by, for example, ribbon connectors, terminal connectors, or the like. In some instances, the PCB assembly 12 may include one or more rigid printed PCBs. In some instances, the PCB assembly 12 may include one or more flexible printed circuit boards (FPCB) that are operably coupled with particular components of the building control device 10. A light assembly 14 is operably coupled to the PCB assembly 12. In some instances, the light assembly 14, or components thereof, may be mechanically and electrically connected to a FPCB that forms part of the PCB assembly 12. In some instances, the light assembly 14, or components thereof, may be mechanically and electrically connected to a FPCB that is itself mechanically and electrically connected to the PCB assembly 12. An LCD (Liquid Crystal Display) 16 is operably coupled to the PCB assembly 12. In some instances, the LCD 16 may be mechanically and electrically connected to a FPCB that forms part of the PCB assembly 12. In some instances, the LCD 16 may be mechanically and electrically connected to a FPCB that is itself mechanically and electrically connected to the PCB assembly 12. In some instances, the light assembly 14 and the LCD 16 may together be considered as forming at least part of a user interface that is configured to display information regarding operation of various components of the building control device 10 and/or one or more devices being controlled by the building control device 10. In some instances, the user interface also allows a user to input information into the building control device 10.

A controller 18 is operably coupled to the PCB assembly 12. In some instances, the controller 18 is configured to control operation of, among other things, the light assembly 14. The controller 18 may also be configured to control operation of the LCD 16. In some instances, the controller 18 may be configured to determine what should be displayed on the LCD 16, and how to display it. In some instances, the controller 18 may also control operation of other features of the building control device 10 and/or devices being controlled by the building control device 10. In some cases, the building control device 10 may include one or more additional controllers (not shown) that control operation of other features of the building control device 10, including but not limited to controlling operation of the building device or devices being controlled by the building control device 10. The various controllers may collectively be considered a "controller".

Figure 2:
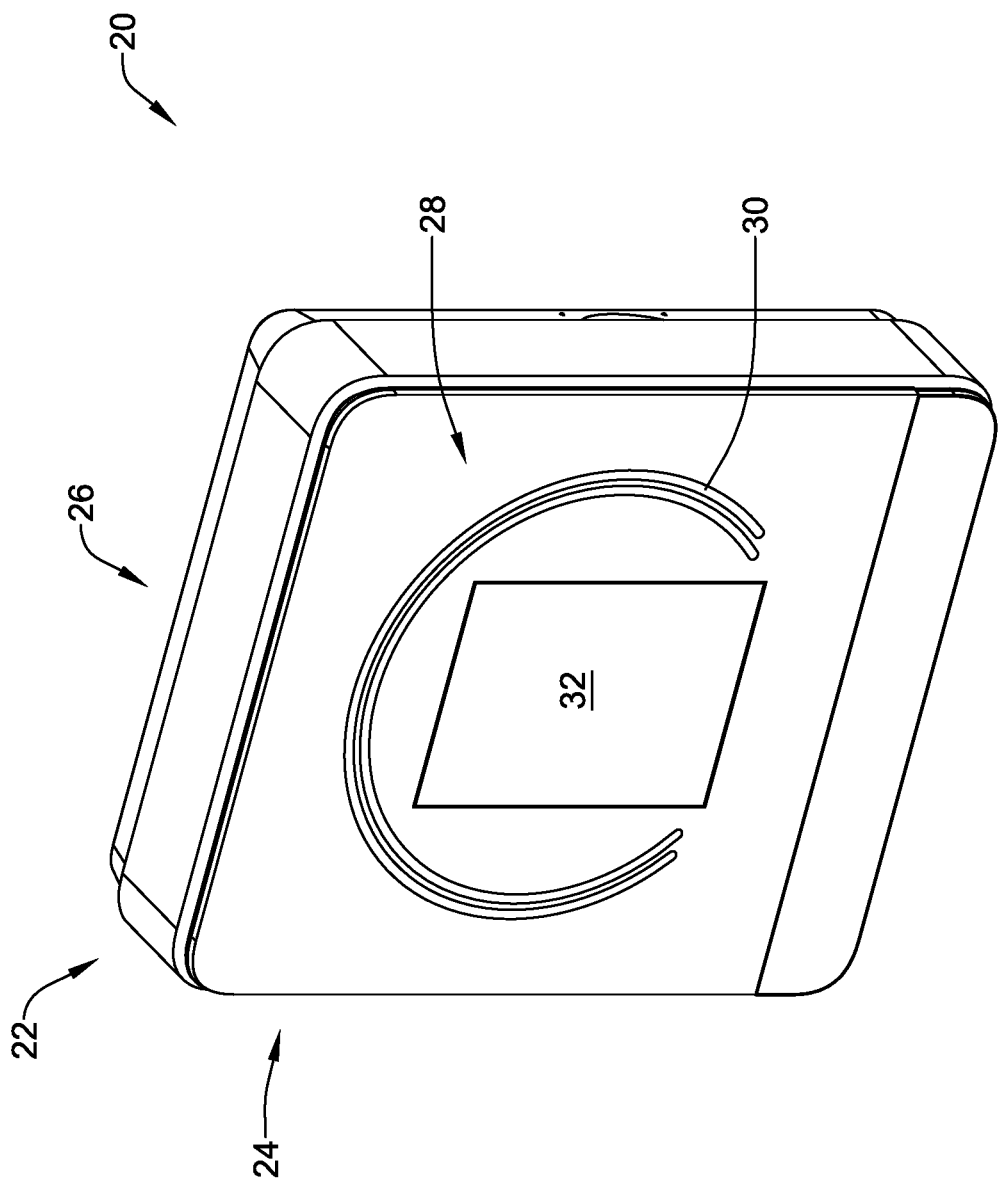
FIG. 2 is a perspective view of an illustrative building control device.

FIG. 2 is a perspective view of an illustrative building control device 20. The illustrative building control device 20 may be considered as being an example of the building control device 10 shown in FIG. 1, and may be considered as including the features described with respect to FIG. 1. The building control device 20 includes a housing 22. In some instances, the housing 22 includes a front face 24 and a back housing 26. The front face 24 may be a single piece, or may include multiple components put together. In some instances, the front face 24 may include a transparent lens. The back housing 26 may be a single molded piece, or may include multiple components put together. In some instances, the back housing 26 may include two or more distinct housing components that are snapped or otherwise secured together.

In some instances, as shown, the building control device 20 may include a user interface 28. In some instances, the user interface 28 may include an arc-shaped light ring 30 and an LCD 32. The arc-shaped light ring 30 may be considered as being an example of the light assembly 14. The LCD 32 may be considered as being an example of the LCD 16 shown in FIG. 1. In some instances, the arc-shaped light ring 30 may be considered as being just part of the light assembly 14. The front face 24 may extend over the arc-shaped light ring 30 and the LCD 32, and may be opaque except for portions that remain clear (or translucent) in order to allow the arc-shaped light ring 30 and the LCD 32 to be visible from a position exterior to the building control device 20. The opaque portions of the front face 24 may be achieved by masking the back (and/or front) side of the front face 24 to make those portions opaque, for example. The masking may include a coating that when applied to the back (and/or front) side of the front face 24, prevents or substantially prevents light from passing through the masked portions of the front face 24, hence creating opaque portions of the front face 24. In some instances, the front face 24 may be made of glass, and thus may be considered as a front glass.

FIG. 3 is a partial exploded view of the building control device 20, showing some of the features and components behind the front face 24. As shown in FIG. 3, the front face 24 includes an arc-shaped region 36 that corresponds to the location of the arc-shaped light ring 30 in FIG. 2, and thus allows light from the arc-shaped light ring 30 (which is disposed behind the front face 24) to be visible from in front of the building control device 20. In some instances, the arc-shaped region 36 is at least translucent, if not transparent, in order to allow light to shine through. The front face 24 also includes a rectilinear-shaped transparent region 38 that corresponds to the location of the LCD 32, and thus allows the LCD 32 to be visible from in front of the building control device 20. The remainder of the front face 24 may have an opaque mask applied to the back (and/or front) surface of the front face 24, apart from the transparent regions.

The illustrative building control device 20 includes an internal housing component 34 that is configured to sit behind the front face 24. In some instances, the internal housing component 34 may be considered as being or including an opaque plate. In some instances, the opaque plate may provide support or mounting features for supporting and/or mounting other components of the building control device 20. In this example, the internal housing component 34 includes an arc-shaped ring 40 that is configured to accommodate the components that together form the arc-shaped light ring 30. In some instances, the components forming the arc-shaped light ring 30 may fit into the arc-shaped ring 40, and may be held in place within the arc-shaped ring 40. In some cases, as shown, the arc-shaped ring 40 includes an inner wall 42 and an outer wall 44 each extending forward (in the illustrated orientation) from a planar portion 46 of the internal housing component 34 with a constant distance between the inner wall 42 and the outer wall 44, thereby forming a light ring receiving channel.

In the example shown, the arc-shaped light ring 30 is formed from several components. As shown, the arc-shaped light ring 30 includes an arc-shaped substrate 48 that has a shape matching that of the arc-shaped ring 40. The arc-shaped substrate 48 may be considered as having a front side 48a (facing towards the left in the illustrated orientation) and a back side 48b (facing towards the right in the illustrated orientation). A number of LEDs (Light Emitting Diodes) 50 are arranged about the arc-shaped substrate 48. In some instances, the arc-shaped substrate 48 may simply provide a mounting for the LEDs 50. In some instances, the arc-shaped substrate 48 may itself be a PCB (e.g. a flexible PCB, or FPCB) to which the LEDs 50 are electrically coupled. Mounting pads for mounting the LEDs 50 and connecting traces may be incorporated into the FPCB. While a total of five LEDs 50 are shown, it will be appreciated that this is merely illustrative. The number of LEDs 50 used may vary depending on the overall dimensions of the arc-shaped light ring 30. The number of LEDs 50 used may also vary depending on the light output of each of the LEDs 50, as well as the desired colors for the arc-shaped light ring 30.

An arc-shaped light guide 52 is adapted to sit in front of the LEDs 50 and the arc-shaped substrate 48. In some cases, the arc-shaped light guide 52 may be configured such that the LEDs 50 and the arc-shaped substrate 48 fit at least partially into a back side of the arc-shaped light guide 52. The arc-shaped light guide 52 includes a first end 54 and a second end 56. The arc-shaped light guide 52 includes a length extending along the arc-shaped light guide 52 between the first end 54 and the second end 56. The arc-shaped light guide 52 includes an arc-shaped light emitting front face 58, an arc-shaped rear face 60, and a side edge 62 disposed between the arc-shaped light emitting front face 58 and the arc-shaped rear face 60. The arc-shaped light ring 30 may be inserted into the arc-shaped ring 40 of the internal housing component 34.

Figure 4:
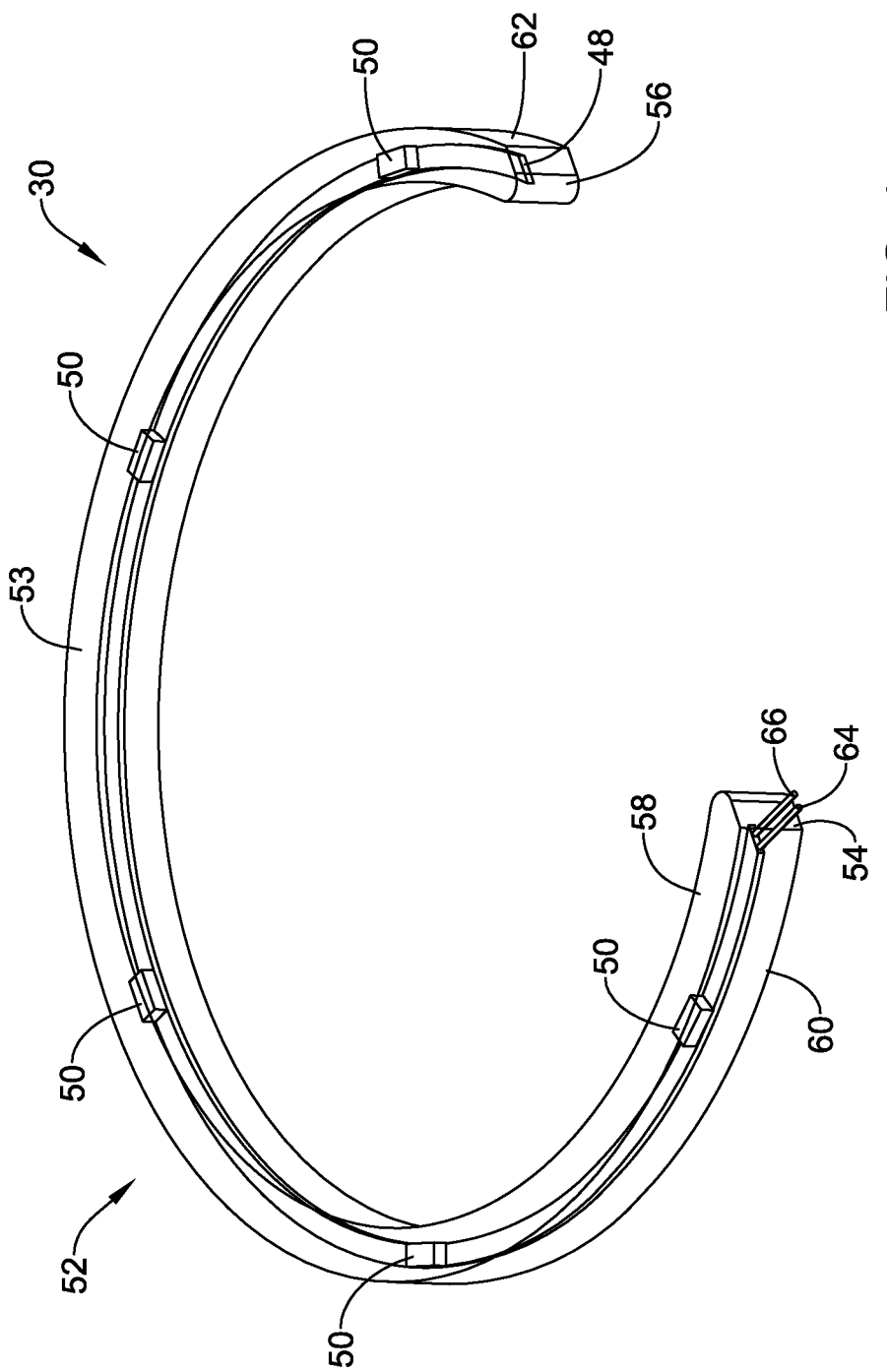
FIG. 4 is a perspective view of an illustrative arc-shaped light guide forming a part of the illustrative building control device of FIG. 2.

FIG. 4 is a perspective view of the arc-shaped light ring 30, which includes the arc-shaped substrate 48 and the arc-shaped light guide 52. In some instances, the arc-shaped light guide 52 may be formed of a polymeric material that is at least partially transparent, such as but not limited to polycarbonate, and may include a light diffuser layer 53 disposed on the arc-shaped light guide 52. As an example, the light diffuser layer may include titanium dioxide. In some cases, the arc-shaped light emitting front face 58 is etched with a light diffusing pattern to diffuse the light output. The diffuse light output may have an intensity variation across the light emitting front face 58 of the elongated arc-shaped light guide 52 that is below a Just Noticeable Difference (JND). The diffuse light output may have an intensity variation across the light emitting front face 58 of the elongated arc-shaped light guide 52 that is less than 10 percent, less than 5 percent, less than 1 percent or less than 0.1 percent. In some cases, the light diffuser layer 53 and/or etched light diffusing pattern may have a non-uniform pattern, sometimes providing a gradient across the light emitting front face 58. In one example, this may provide a "fade" effect where the diffuse light output fades from a higher intensity to a lower intensity across at least part of the light emitting front face 58 of the elongated arc-shaped light guide 52. Such as a "fade" effect may fade from a higher intensity at the top of the arc to a lower intensity at each of the bottom ends of the arc. In the example shown, the illustrative arc-shaped light ring 30 includes several electrical conductors 64 and 66 that extend from the arc-shaped substrate 48 and provide for an electrical connection with each of the LEDs 50 shown mounted to the arc-shaped substrate 48.

Figure 5:
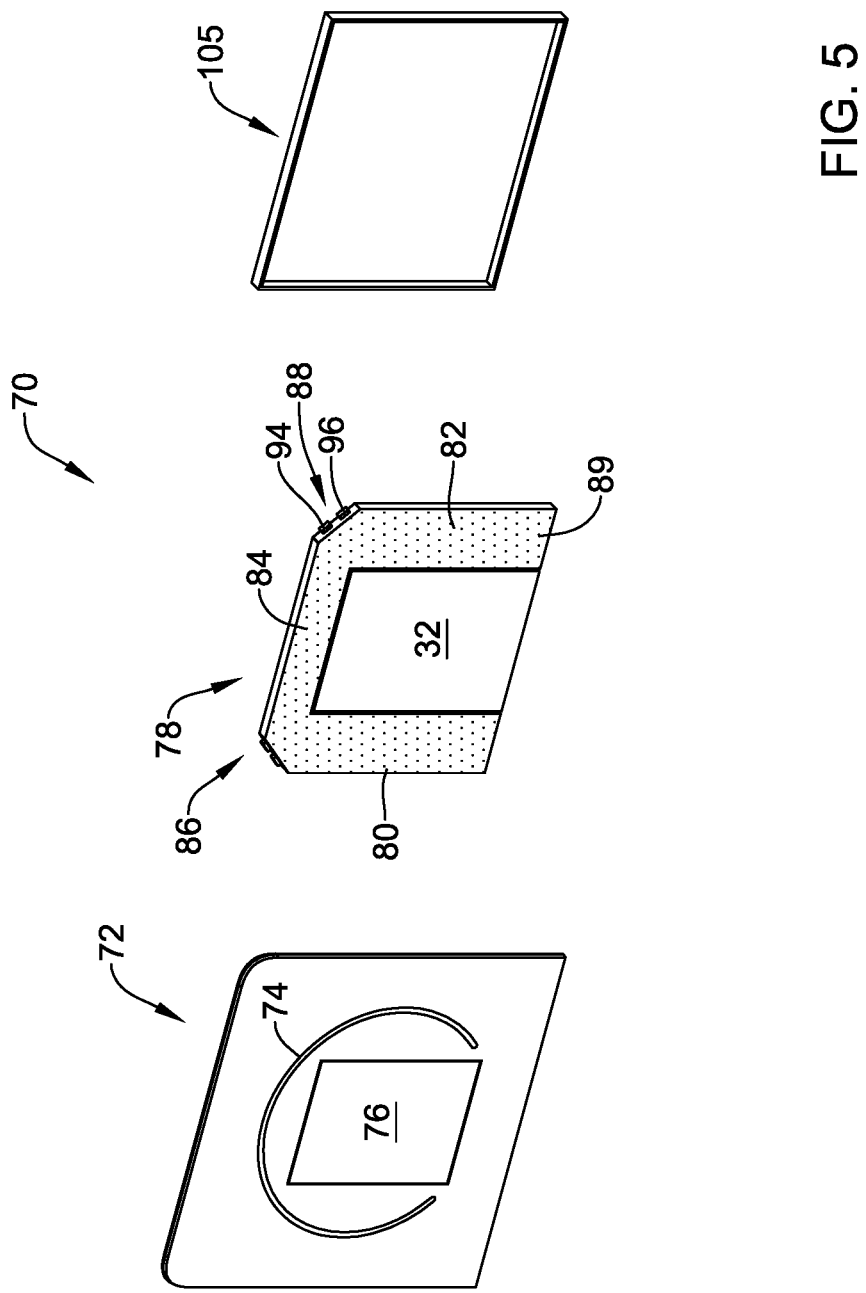
FIG. 5 is a partially exploded view of an illustrative building control device.

FIG. 5 is a partially exploded view of a building control device 70. The building control device 70 may be considered as similar to the building control device 10 and the building control device 20, and may share similar features to the building control device 10 and the building control device 20. The building control device 70 differs, however, in how the arc-shaped light ring 30 is formed. As seen in FIG. 5, the building control device 70 includes a front face 72.

The front face 72 includes an arc-shaped transparent region 74 that corresponds to the location of the arc-shaped light ring 30, and thus allows light from the arc-shaped light ring 30 to be visible from in front of the building control device 70. While an arc-shaped transparent region 74 is shown, it is contemplated that the transparent region 74 may be any suitable continuous or non-continuous shape, depending on the application. The continuous or non-continuous shape needs only to remain in front of the light guide 78 so that the continuous or non-continuous shape can be properly back lit by the light guide 78. The front face 72 also includes a rectilinear-shaped transparent region 76 that corresponds to the location of the LCD 32, and thus allows the LCD 32 to be visible from in front of the building control device 70. The remainder of the front face 24 may have an opaque mask applied to the back surface of the front face 72, apart from the transparent regions.

The building control device 70 includes a light guide 78. The light guide 78 includes a first leg 80, a second leg 82 that may be considered as being parallel with the first leg 80, and a third leg 84 that extends between the first leg 80 and the second leg 82. The light guide 78 includes an intersection 86 between the first leg 80 and the third leg 84. The light guide 78 includes an intersection 88 between the second leg 82 and the third leg 84. In some instances, a light diffuser layer 89, indicated by a dotted pattern, may be formed on a front surface of the light guide 78. Alternatively, or in addition, the light guide may be etched with a light diffusing pattern to diffuse the light output from the front surface of the light guide 78. The building control device 70 also includes an internal housing component 105 that may represent one or more different components, including for example the PCB assembly 12.

Figure 6:
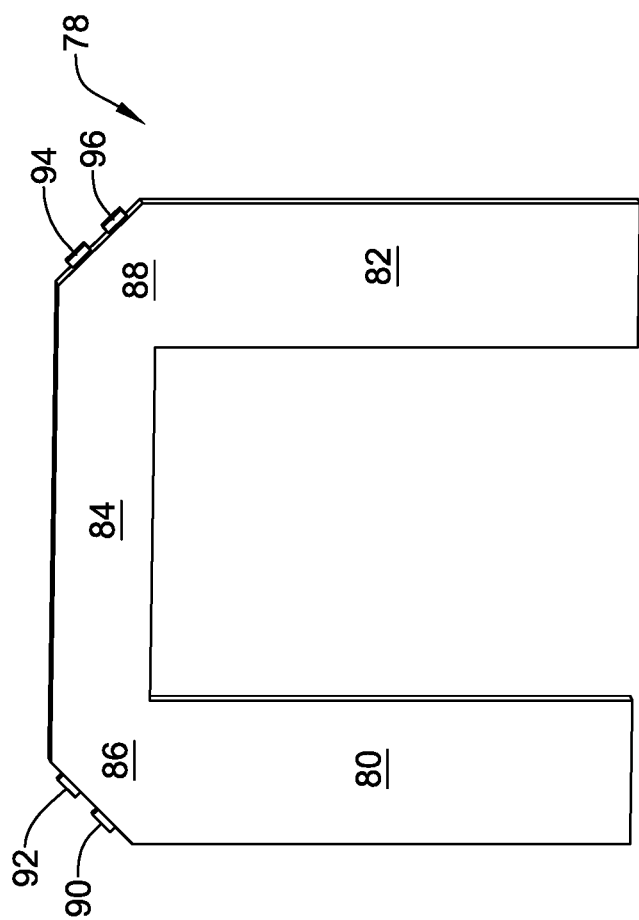
FIG. 6 is a front view of an illustrative light guide forming a part of the illustrative building control device of FIG. 5.
Figure 7:
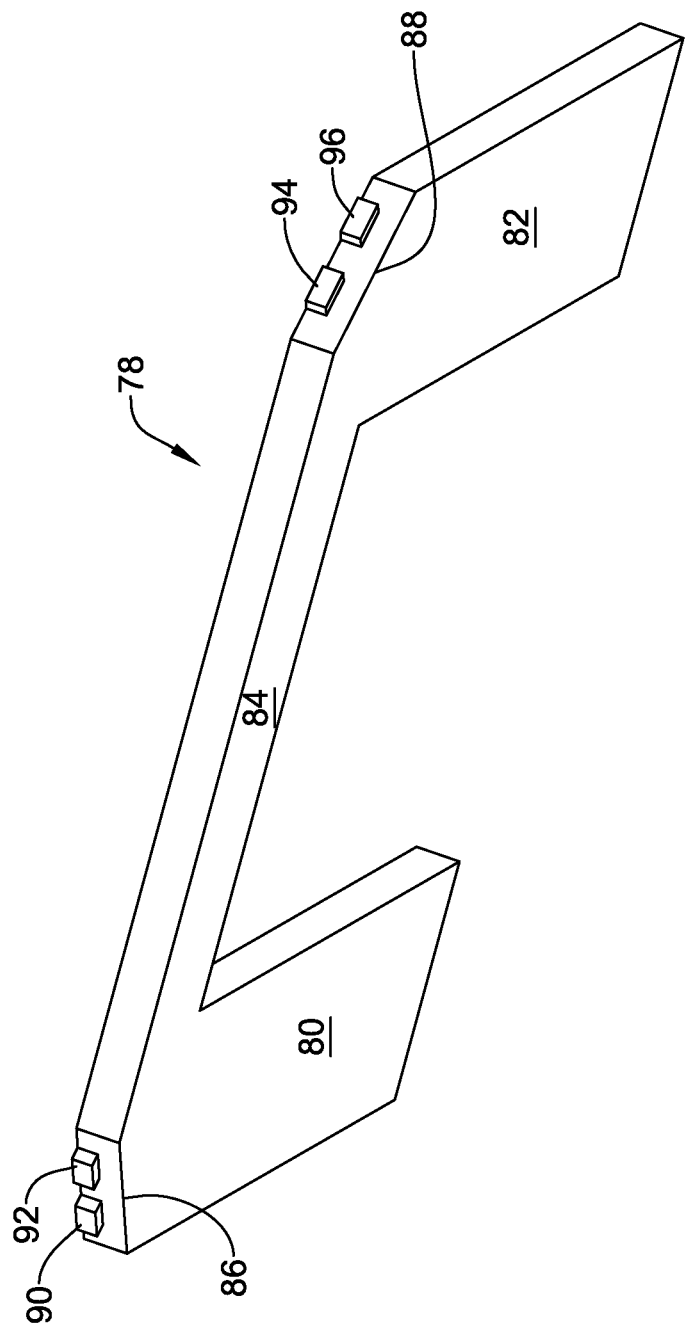
FIG. 7 is a top perspective view of the illustrative light guide shown in FIG. 6.

In some instances, one or more LEDs may be secured within each of the intersection 86 and the intersection 88. As seen for example in FIG. 6, which is a front view of the light guide 78, and FIG. 7, which is a top perspective view of the light guide 78, a first LED 90 and a second LED 92 may be optically coupled to the light guide 78 proximate the intersection 86. A third LED 94 and a fourth LED 96 may be optically coupled to the light guide 78 proximate the intersection 88. In some cases, while not shown, the LEDs 90, 92, 94 and 96 may be electrically connected to a printed circuit board (such as the PCB assembly 12 shown in FIG. 1) that is disposed behind the light guide 78.

In some cases, the first LED 90 and the third LED 94 may each be LEDs configured to output a first color and the second LED 92 and the fourth LED 96 may each be LEDs configured to output a second color that is different from the first color. According, the light guide 78 may be lit up in the first color by energizing the first LED 90 and the third LED 94, but not the second LED 92 and the fourth LED 96. The light guide 78 may be lit up in the second color by energizing the second LED 92 and the fourth LED 96, but not the first LED 90 and the third LED 94. The light guide 78 may be lit up in a third color (representing a combination of the first color and the second color) by energizing all four LEDs 90, 92, 94 and 96. As an example, the first color may be blue and the second color may be orange, but other colors are also contemplated.

Figure 8:
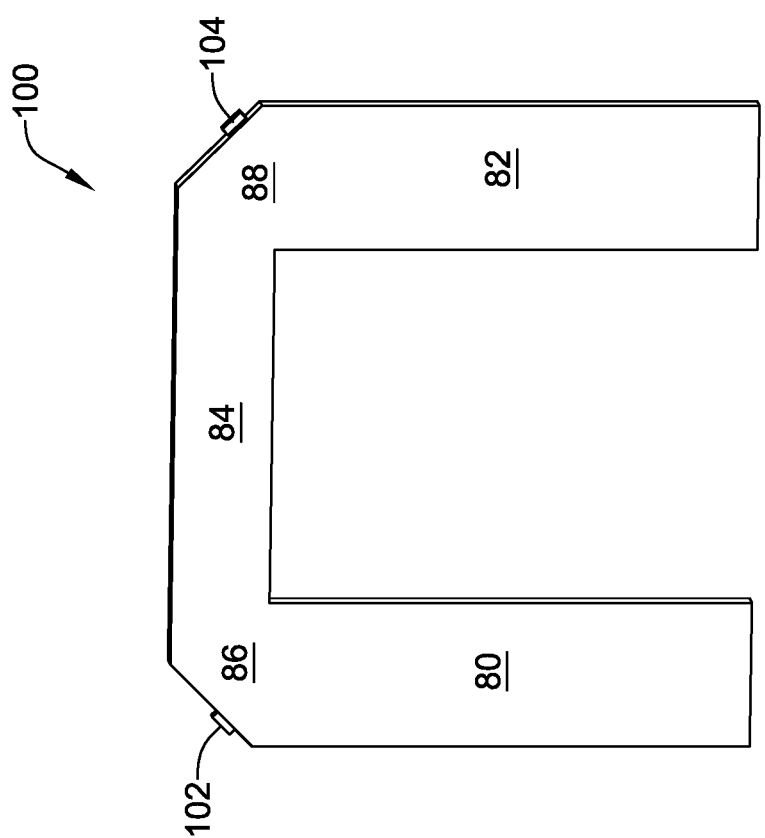
FIG. 8 is a front view of an illustrative light guide that may be used as part of the illustrative building control device of FIG. 5.

In some cases, an LED may be configured to output multiple colors. FIG. 8 shows a light guide 100 that is similar to the light guide 78, but only includes a first LED 102 disposed proximate the intersection 86 and a second LED 104 disposed proximate the intersection 88. In some instances, each of the first LED 102 and the second LED 104 may be what are known as RGB LEDs, meaning that they are configured to produce the primary colors red, green and blue. By varying the intensity of the red light produced, the green light produced, and the blue light produced, virtually any color can be produced. Accordingly, the light guide 100 may be able to light up with any color that the LEDs 102 and 104 are able to produce.

In some cases, the intensity of the light provided by the LED's may be changed to indicated a state of the building controller, a condition of the building controller, a mode of the building controller and so on. In some cases, the intensity and color of the light provided by the LED's may be changed to indicated a state of the building controller, a condition of the building controller, a mode of the building controller and so on. In some cases, the intensity of the light provided by the LED's may be cycled over time from brighter to dimmer and then dimmer to brighter in a sinusoidal or other pattern. This may present a "breathing" effect (inhale and exhale) to the user, indicating the building controller is operating properly and not hung.

With brief reference to FIG. 1, the light assembly 14 and the LCD 16 are electrically coupled to the PCB assembly 12. In some instances, the light assembly 14 and the LCD 16 may be directly connected to the PCB assembly 12. In some instances, the light assembly 14 may include its own FPCB and the LCD 16 may include its own FPCB. In some instances, the light assembly 14 and the LCD 16 may both be connected to a single FPCB, which is separately mechanically and electrically connected with the PCB assembly 12. It will be appreciated that there are a variety of ways in which the light assembly 14 and the LCD 16 may be mechanically and/or electrically coupled with the PCB assembly 12.

Figure 9:
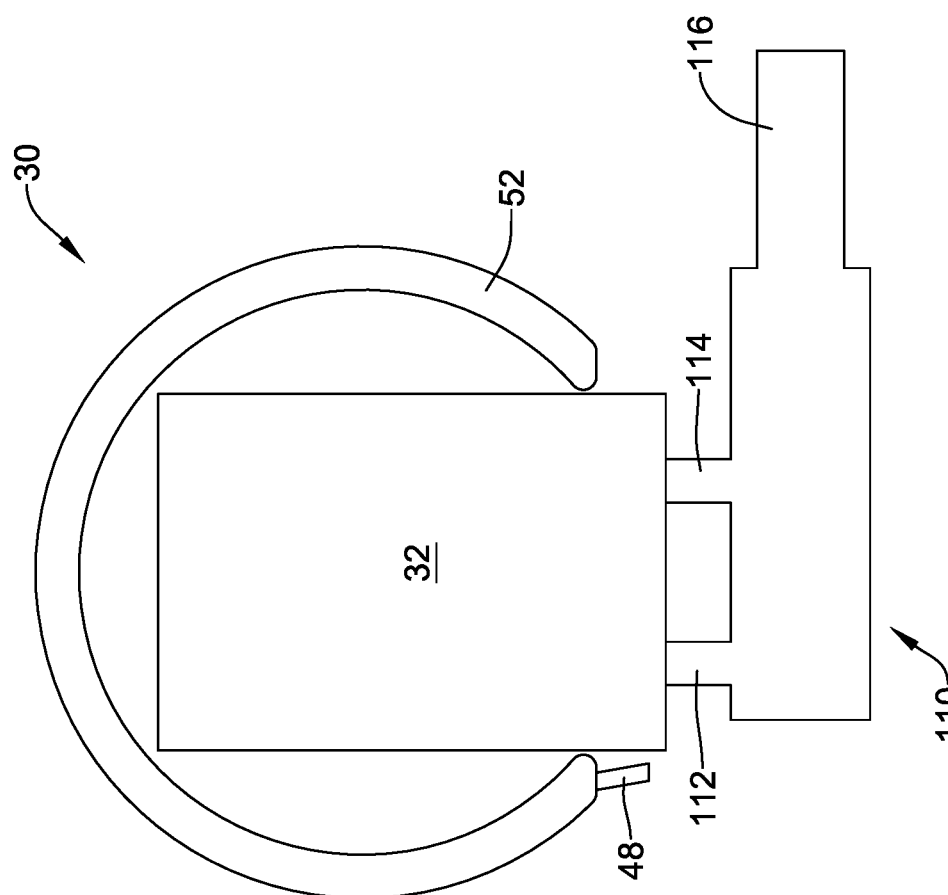
FIG. 9 is a front view of an illustrative arc-shaped light ring 30 forming a part of the illustrative building control device shown in FIGS. 3 and 4.

FIG. 9 is a front view of the arc-shaped light ring 30 and LCD 32 as shown for example in FIG. 3. As can be seen, the arc-shaped substrate 48 can be seen as extending beyond the arc-shaped light guide 52 so that the LEDs 50 that are mounted on the arc-shaped substrate 48 can be electrically coupled to the PCB assembly 12 and thus controlled by the controller 18, for example. In some instances, a flexible connector may extend from the arc-shaped substrate 48 to the PCB assembly 12 in order to electrically couple the arc-shaped substrate 48 with the controller 18 that is mounted relative to the PCB assembly 12. The LCD 32 may be seen as including its own FPCB 110. The FPCB 110 includes two leads 112 and 114 that are configured to allow the LCD 32 to be electrically and mechanically coupled to the FPCB 110. In some instances, the LCD 32 may be manufactured with the FPCB 110 as an integral part of the LCD 32. In some instances, the LCD 32 may include electrical connectors that are individually soldered or otherwise mechanically and electrically coupled to the leads 112 and 114 of the FPCB 110. The FPCB 110 also includes a tail piece 116 that may be configured to be mechanically and electrically coupled to the PCB assembly 12 in order to electrically couple the LCD 32 with the controller 18 so that the controller 18 may control operation of the LCD 32.

Figure 10:
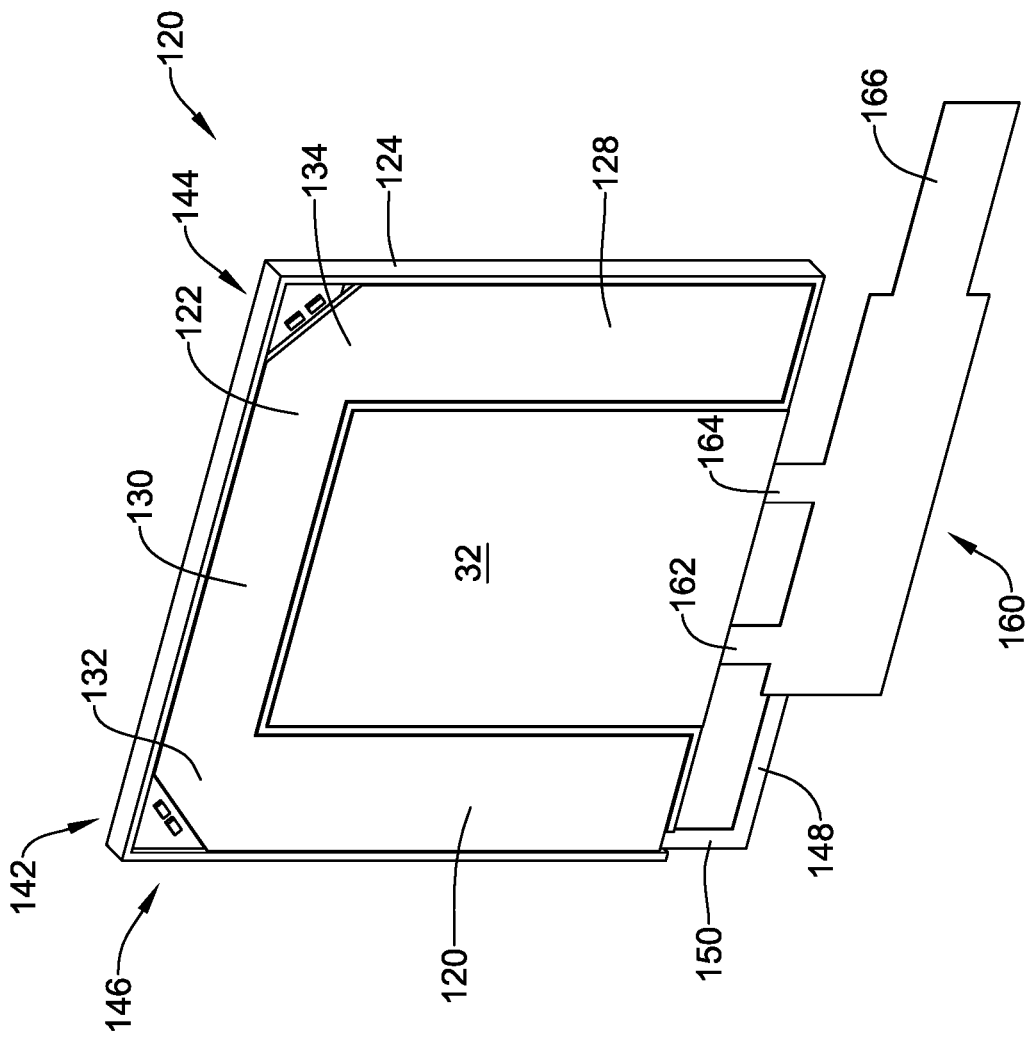
FIG. 10 is a perspective view of an illustrative building control device with its front face removed.
Figure 11:
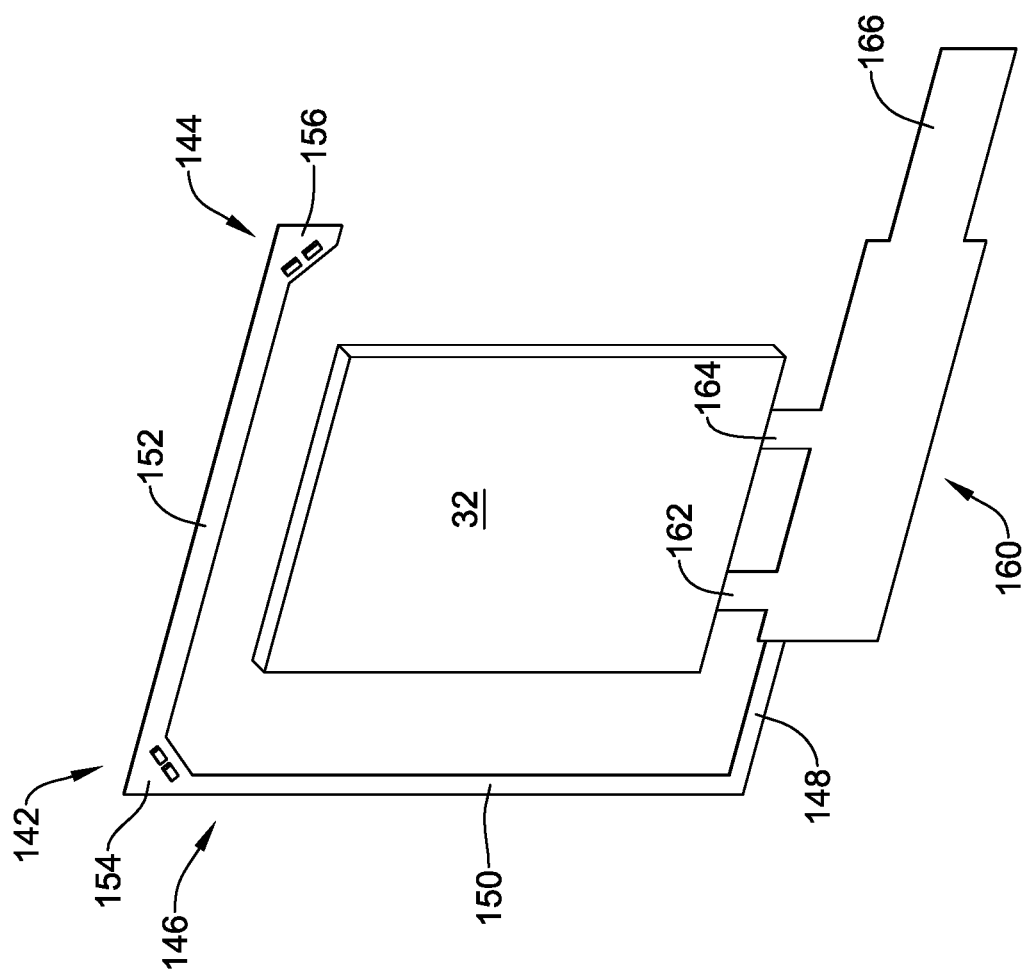
FIG. 11 is a perspective view of an illustrative lighting assembly and LCD forming part of the illustrative building control device shown in FIG. 10.
Figure 12:
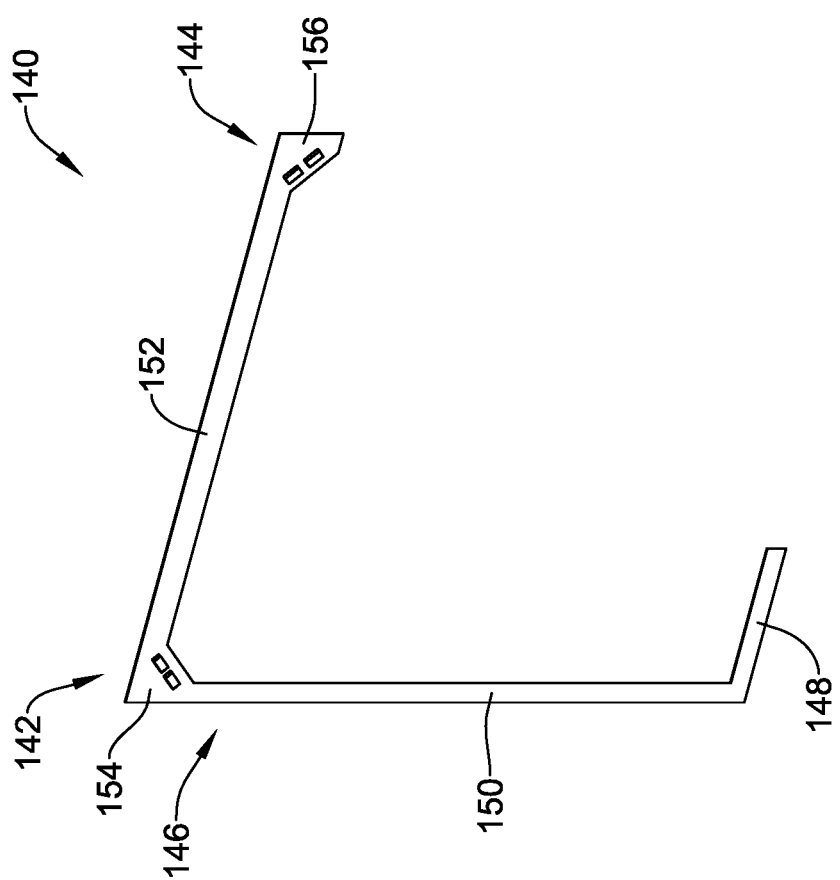
FIG. 12 is a perspective view of an illustrative flexible printed circuit board and associated LEDs forming part of the illustrative lighting assembly of FIG. 11.

FIG. 10 is a perspective view of an illustrative building control device 120. It will be appreciated that the front face of the building control device 120 has been removed in order to better show internal components. FIG. 11 is a perspective view of the building control device 120 with additional components removed. FIG. 12 is a perspective view of a lighting assembly 140 that provides illumination to a light guide 122. The light guide 122 fits into an internal housing component 124. In some instances, the internal housing component 124 may be considered as being an opaque plate, much like the internal housing component 34. In some instances, the internal housing component 124 may help to locate and secure other components such as the light guide 122 and the lighting assembly 140, for example.

In some instances, the light guide 122 may include a diffusive pattern such as the light diffuser layer 89 shown in FIG. 5 in order to permit light to pass through the light guide 122 while providing a more uniform lighting appearance. As shown, the light guide 122 includes a first leg 126, a second leg 128 that may be considered as being parallel with the first leg 126, and a third leg 130 that extends between the first leg 126 and the second leg 128. The light guide 122 includes an intersection 132 between the first leg 126 and the third leg 130. The light guide 122 includes an intersection 134 between the second leg 128 and the third leg 130. In some instances, as shown, the intersection 132 and the intersection 134 may each define a clipped corner in order to accommodate one or more LEDs 142 and one or more LEDs 144, respectively, that are part of the lighting assembly 140 disposed behind the light guide 122.

In addition to the one or more LEDs 142 and the one or more LEDs 144, the lighting assembly 140 also includes an FPCB 146 that is configured to extend behind the light guide 122 and position the LEDs 142 and 144 relative to the intersection 132 and the intersection 134, respectively. The FPCB 146 includes a first leg 148, a second leg 150 that forms a right angle with the first leg 148 and a third leg 152 that forms a right angle with the second leg 150 (see FIGS. 11-12). The LEDs 142 are positioned within a corner region 154 that is positioned at an intersection between the second leg 150 and the third leg 152. The LEDs 144 are positioned within a corner region 156 that is positioned next to a free end of the third leg 152. In some cases, the LEDs 142 and the LEDs 144 may each be configured to output a particular color. If the LEDs 142 and the LEDs 144 all output the same color, then the light guide 122 will transmit light of that color. By illuminating LEDs 142, 144 of differing colors, by combining the colors additional colors may be produced.

Referring again to FIG. 10, the building control device 120 includes the LCD 32. In some instances, as shown, the LCD 32 may be mechanically and electrically coupled with a FPCB 160. The FPCB 160 includes two leads 162 and 164 that are configured to allow the LCD 32 to be electrically and mechanically coupled to the FPCB 160. In some instances, the LCD 32 may be manufactured with the FPCB 160 as an integral part of the LCD 32. In some instances, the LCD 32 may include electrical connectors that are individually soldered or otherwise mechanically and electrically coupled to the leads 162 and 164 of the FPCB 160. The FPCB 160 also includes a tail piece 166 that may be configured to be mechanically and electrically coupled to the PCB assembly 12 in order to electrically couple the LCD 32 with the controller 18 so that the controller 18 may control operation of the LCD 32. In some instances, the FPCB 146, or at least the first leg 148 thereof, may be coplanar with the FPCB 160, and thus may be easily electrically and mechanically coupled with the FPCB 160.

Figure 13:
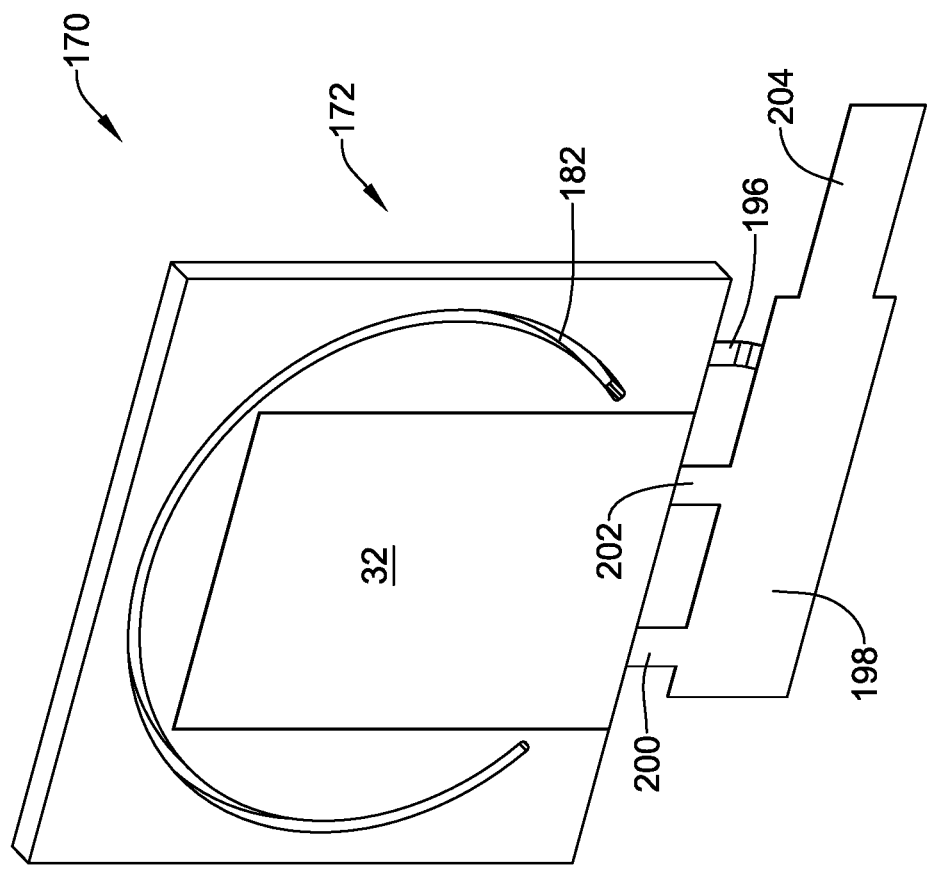
FIG. 13 is a perspective view of an illustrative building control device with its front face removed.
Figure 14:
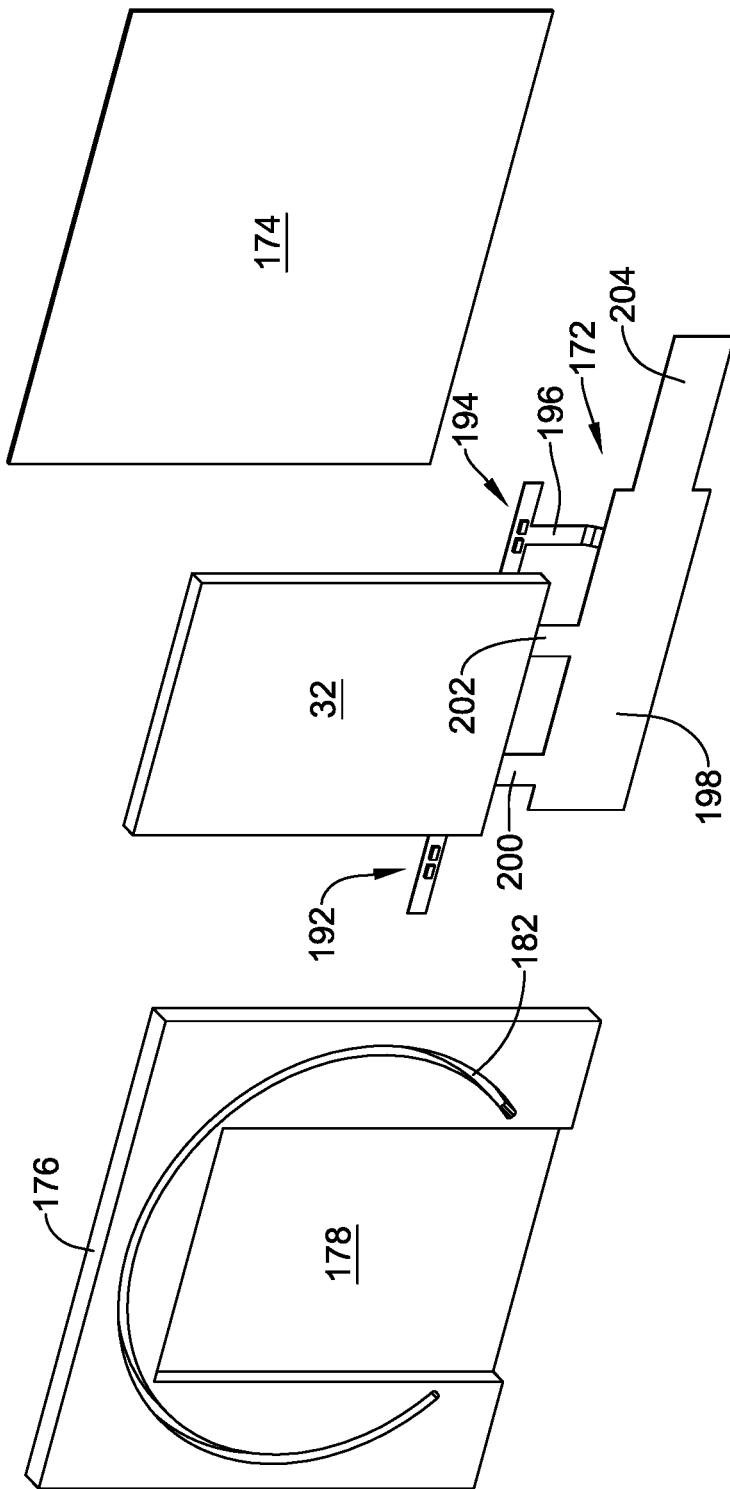
FIG. 14 is a partially exploded front view of the illustrative building control device of FIG. 13.
Figure 15:
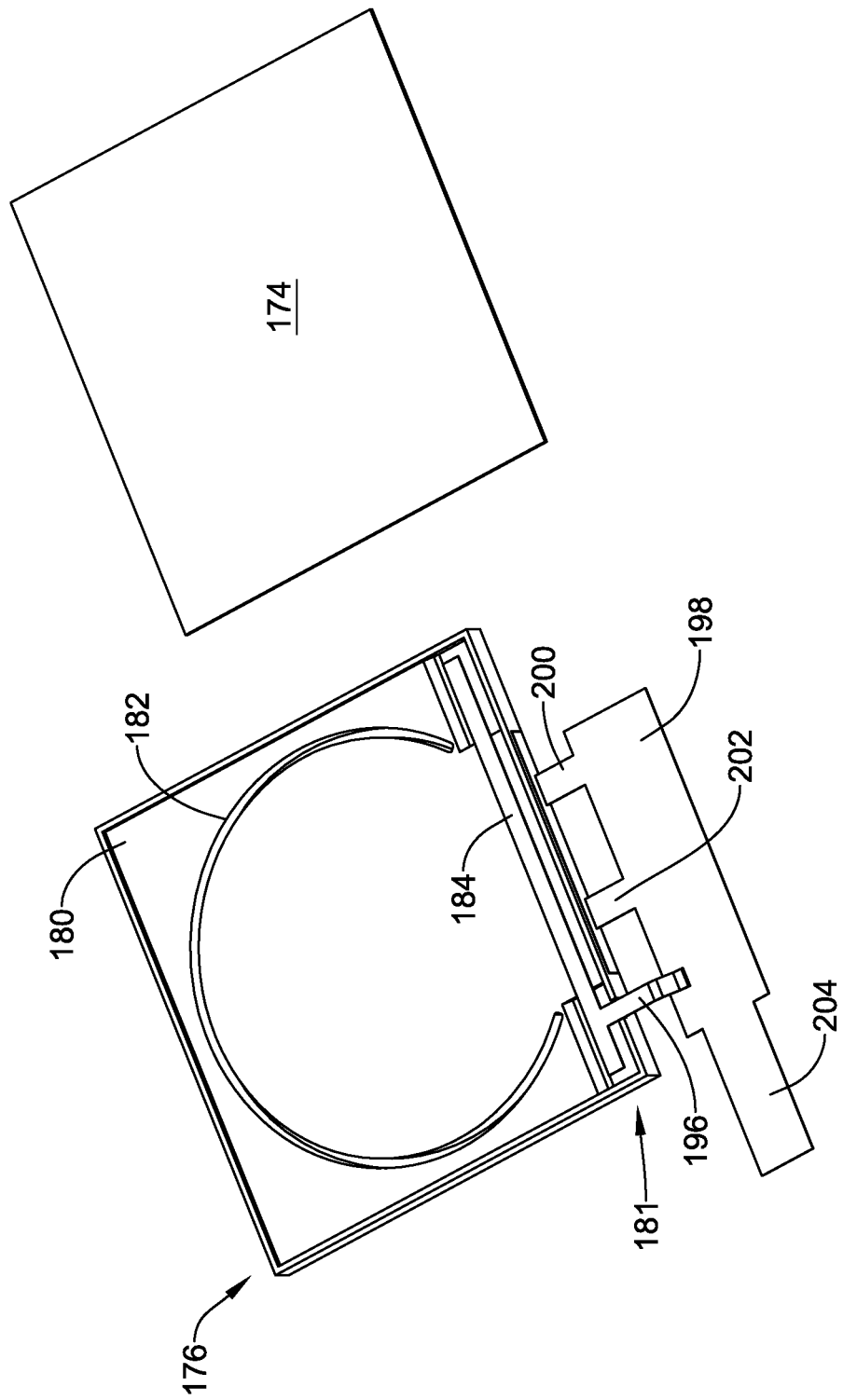
FIG. 15 is a partially exploded back view of the illustrative building control device of FIG. 13.
Figure 16:
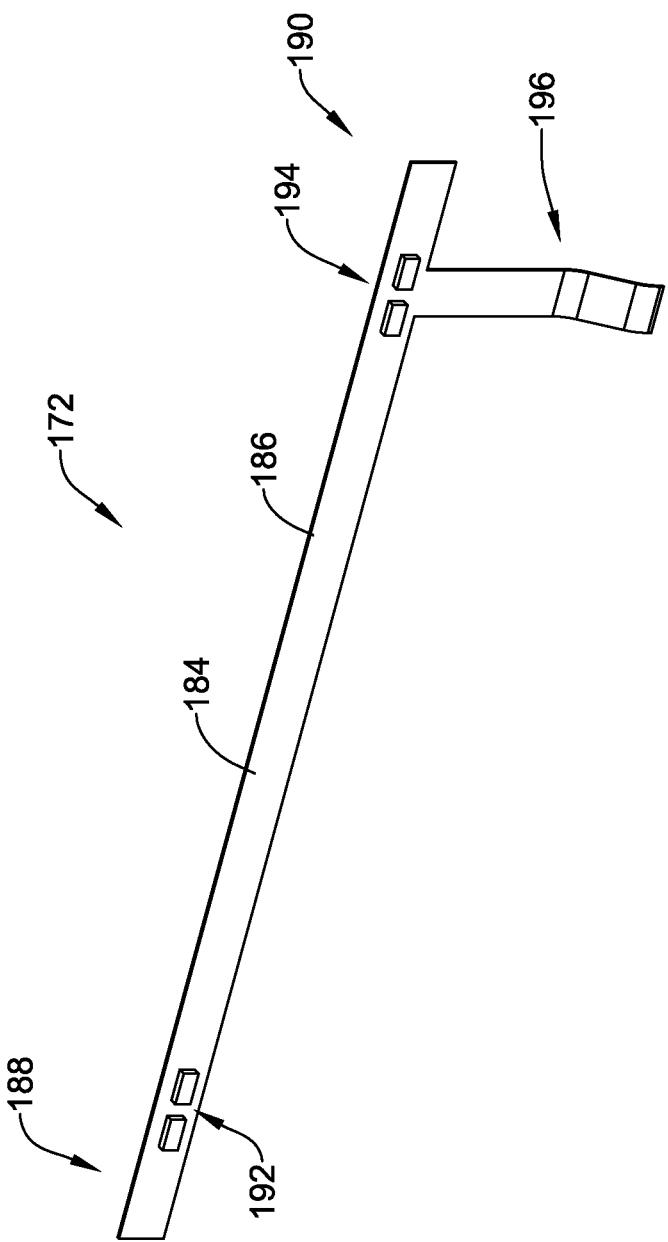
FIG. 16 is a perspective view of an illustrative flexible printed circuit board and associated LEDs forming part of the illustrative lighting assembly of FIG. 13.

FIG. 13 is a perspective view of an illustrative building control device 170. It will be appreciated that the front face of the building control device 170 has been removed in order to better show internal components. FIG. 14 is a partially exploded front view of the building control device 170 while FIG. 15 is a partially exploded back view thereof. FIG. 16 is a perspective view of a lighting assembly 172 that provides illumination to a light guide 174. The building control device 170 includes an internal housing component 176. The internal housing component 176 includes a front recess or slot 178 that is configured to accommodate the LCD 32 within the front recess 178. The internal housing component 176 also includes a back recess 180 that is configured to accommodate the light guide 174 within the back recess 180. In some instances, as shown, the internal housing component 176 also includes a lower recess 181 that is configured to accommodate the lighting assembly 172. The internal housing component 176, which may also be referred to as an opaque plate, includes an arc-shaped window 182 that allows light from the light guide 174 to pass through the arc-shaped window 182 in order to form an illuminated arc shape on the front face of the building control device 170. The arc-shaped window 182 may be considered as being at least translucent, if not transparent.

The lighting assembly 172 includes a FPCB 184. The FPCB 184 includes a linear segment 186 that extends from a first region 188 to a second region 190 (see FIG. 16). One or more LEDs 192 (two are shown) are secured to the FPCB 184 within the first region 188 and one or more LEDs 194 (two are shown) secured to the FPCB 184 within the second region 190. The LEDs 192 and 194 may be mechanically and electrically coupled to the FPCB 184. In some cases, the LEDs 192 and the LEDs 194 may each be configured to output a particular color. If the LEDs 192 and the LEDs 194 all output the same color, then the light guide 174 will transmit light of that color to and through the arc-shaped window 182. By illuminating LEDs 192, 194 of differing colors, by combining the colors additional colors may be produced.

The FPCB 184 also includes a connection segment 196 that is configured to allow the lighting assembly 172 to be operably coupled with the PCB assembly 12. In some instances, as shown, the connection segment 196 may include one or more bends that allow the FPCB 184 to be disposed in a first plane while still allowing the connection segment 196 to make mechanical and electrical contact with the a FPCB 198 and ultimately to PCB assembly 12, even if the FPCB 198 is in a different plane while still parallel with the first plane, is offset from the first plane.

The building control device 170 includes the LCD 32 (see FIG. 14). In some instances, as shown, the LCD 32 may be mechanically and electrically coupled with the FPCB 198. The FPCB 198 includes two leads 200 and 202 that are configured to allow the LCD 32 to be electrically and mechanically coupled to the FPCB 198. In some instances, the LCD 32 may be manufactured with the FPCB 198 as an integral part of the LCD 32. In some instances, the LCD 32 may include electrical connectors that are individually soldered or otherwise mechanically and electrically coupled to the leads 200 and 202 of the FPCB 198. The FPCB 198 also includes a tail piece 204 that may be configured to be mechanically and electrically coupled to the PCB assembly 12 in order to electrically couple the LCD 32 with the controller 18 so that the controller 18 may control operation of the LCD 32. In some instances, as shown, the connection segment 196 (of the FPCB 184 bearing the LEDs 192 and 194) may be mechanically and electrically coupled to conductive traces or a connector mounted on the FPCB 198.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A building control device having a front side and a back side, the building control device comprising:
   a printed circuit board including control circuitry for controlling at least part of the building control device;
   an LCD display operatively coupled to the printed circuit board and controlled at least in part by the control circuitry of the printed circuit board, the LCD display configured to be visible from the front side of the building control device;
   a plurality of LEDs operatively coupled to the printed circuit board and controlled at least in part by the control circuitry of the printed circuit board;
   an opaque plate that defines an at least translucent arc-shaped region that extends around a periphery of at least part of the LCD display;
   a light guide situated behind the opaque plate, the light guide configured to be illuminated by the plurality of LEDs such that light from the light guide is visible through the at least translucent arc-shaped region of the opaque plate from the front side of the building control device;
   a front lens situated in front of the opaque plate, wherein the front lens is masked to be opaque except in one or more defined regions, wherein the one or more defined regions expose:
      the at least translucent arc-shaped region of the opaque plate such that light passing through the at least translucent arc-shaped region of the opaque plate is visible from the front side of the building control device;
      an LCD viewing window that is aligned with the LCD display through which at least part of the LCD display is visible from the front side of the building control device; and
   wherein the LCD display and the at least translucent arc-shaped region together form at least part of a user interface of the building control device for conveying information, wherein one or more of a color of a plurality of colors and a light intensity of a plurality of light intensities of light that is provided by the light guide and visible through the at least translucent arc-shaped region of the opaque plate indicate a current state of the building control device, a current condition of the building control device and/or a current mode of the building control device.

2. The building control device of claim 1, wherein the opaque plate defines an LCD receiving slot for receiving at least part of the LCD display and for aligning the LCD display relative to the at least translucent arc-shaped region of the opaque plate.

3. The building control device of claim 2, wherein the light guide extends behind the LCD receiving slot of the opaque plate.

4. The building control device of claim 1, wherein the light guide includes a light diffuser for providing a diffused light output across a light emitting face of the light guide.

5. The building control device of claim 4, wherein the light guide includes a gradient in the light diffuser in at least one dimension of the light guide to achieve a fade effect in the diffused light output across the light emitting face of the light guide to provide a fade effect where the diffuse light output fades from a higher light intensity to a lower light intensity along a length of the at least translucent arc-shaped region of the opaque plate.

6. The building control device of claim 1, wherein the at least translucent arc-shaped region of the opaque plate extends along an arc of at least 180 degrees and around at least part of two opposing sides of the LCD display.

7. The building control device of claim 1, wherein the light guide overlaps the entire at least translucent arc-shaped region of the opaque plate.

8. The building control device of claim 1, wherein the at least translucent arc-shaped region comprises an opening through the opaque plate.

9. A building control device, comprising:
  a printed circuit board including a control circuitry for controlling at least part of the building control device;
  an LCD display operatively coupled to the printed circuit board and controlled at least in part by the control circuitry of the printed circuit board;
  a plurality of LEDs operatively coupled to the printed circuit board and controlled at least in part by the control circuitry of the printed circuit board;
  a front lens that is masked to be opaque except in one or more defined regions, wherein the one or more defined regions define:
    an LCD viewing window that is aligned with the LCD display;
    an arc-shaped window that is spaced from and extends around a periphery of at least part of the LCD viewing window;
  a light guide situated behind the front lens, the light guide configured to be illuminated by the plurality of LEDs such that light from the light guide is visible through the arc-shaped window defined by the front lens;
  an opaque plate situated between the light guide and the front lens, the opaque plate defining an at least translucent arc-shaped region that is in registration with the arc-shaped window of the front lens; and
  wherein the LCD display and the arc shaped window together form at least part of a user interface of the building control device for conveying information regarding operation of the building control device, wherein one or more of a color of a plurality of colors and a light intensity of a plurality of light intensities of light that is provided by the light guide and visible through the at least translucent arc-shaped region of the opaque plate indicate a current state of the building control device, a current condition of the building control device and/or a current mode of the building control device.

10. The building control device of claim 9, wherein the opaque plate comprises an LCD receiving slot for receiving at least part of the LCD display and for aligning the LCD display relative to the at least translucent arc-shaped region of the opaque plate.

11. The building control device of claim 10, wherein the light guide is configured to overlap the at least translucent arc-shaped region and the LCD receiving slot of the opaque plate.

12. The building control device of claim 9, wherein the light guide is configured to extend laterally beyond at least three sides of the LCD display.

13. The building control device of claim 9, wherein the arc-shaped window of the front lens extends along an arc of at least 180 degrees and around at least part of two opposing sides of the LCD display.

14. The building control device of claim 9, wherein the light guide includes a light diffuser for providing a diffused light output across a light emitting face of the light guide, and wherein the light guide includes a gradient in the light diffuser in at least one dimension of the light guide to achieve a fade effect in the diffused light output across the light emitting face of the light guide.

15. A building control device comprising:
  a printed circuit board including a control circuitry for controlling at least part of the building control device;
  an LCD display operatively coupled to the printed circuit board and controlled at least in part by the control circuitry of the printed circuit board;
  a plurality of LEDs operatively coupled to the printed circuit board and controlled at least in part by the control circuitry of the printed circuit board;
  a front lens that is masked to be opaque except in one or more defined regions, wherein the one or more defined regions define:
    an LCD viewing window that is aligned with the LCD display; and
    an arc-shaped window that is spaced from and extends around a periphery of at least part of the LCD viewing window;
  a light guide situated behind the front lens, the light guide configured to be illuminated by the plurality of LEDs; and
  an opaque plate situated between the light guide and the front lens, the opaque plate defining an at least translucent arc-shaped region that is in registration with the arc-shaped window of the front lens, the at least translucent arc-shaped region allowing light from the light guide to pass through the at least translucent arc-shaped region of the opaque plate and to the arc-shaped window defined by the front lens.

16. The building control device of claim 15, wherein the at least translucent arc-shaped region corresponds to an opening through the opaque plate.

17. The building control device of claim 16, wherein each of the at least translucent arc-shaped region of the opaque plate and the arc-shaped window of the front lens extend along an respective arc of at least 180 degrees and around at least part of the LCD display.

* * * * *